(12) United States Patent
Shrivastava et al.

(10) Patent No.: US 8,213,074 B1
(45) Date of Patent: Jul. 3, 2012

(54) ONBOARD CONTROLLER FOR MULTISTATE WINDOWS

(75) Inventors: Dhairya Shrivastava, Los Altos, CA (US); Anshu Pradhan, Fremont, CA (US); Stephen C. Brown, San Mateo, CA (US); David Walter Groechel, Sunnyvale, CA (US)

(73) Assignee: Soladigm, Inc., Milpitas, CA (US)

( * ) Notice: Subject to any disclaimer, the term of this patent is extended or adjusted under 35 U.S.C. 154(b) by 0 days.

(21) Appl. No.: 13/049,750

(22) Filed: Mar. 16, 2011

(51) Int. Cl.
*G02F 1/153* (2006.01)
*G02F 1/15* (2006.01)
*G09G 3/38* (2006.01)
*H04N 9/16* (2006.01)

(52) U.S. Cl. ......... 359/275; 359/265; 345/105; 348/817

(58) Field of Classification Search .......... 359/265–275, 359/277, 245–247, 242; 345/49, 105; 250/70; 348/814, 817; 438/929; 349/182–186
See application file for complete search history.

(56) References Cited

U.S. PATENT DOCUMENTS

| | | | |
|---|---|---|---|
| 5,124,833 A | 6/1992 | Barton et al. | |
| 5,204,778 A | 4/1993 | Bechtel | |
| 5,220,317 A | 6/1993 | Lynam et al. | |
| 5,365,365 A | 11/1994 | Ripoche et al. | |
| 5,379,146 A | 1/1995 | Defendini | |
| 5,384,578 A | 1/1995 | Lynam et al. | |
| 5,402,144 A | 3/1995 | Ripoche | |
| 5,451,822 A | 9/1995 | Bechtel et al. | |
| 5,598,000 A | 1/1997 | Popat | |
| 5,673,028 A * | 9/1997 | Levy | 340/635 |
| 5,694,144 A | 12/1997 | Lefrou et al. | |
| 5,822,107 A | 10/1998 | Lefrou et al. | |
| 5,900,720 A | 5/1999 | Kallman et al. | |
| 5,956,012 A | 9/1999 | Turnbull et al. | |
| 5,973,818 A | 10/1999 | Sjursen et al. | |
| 5,973,819 A | 10/1999 | Pletcher et al. | |
| 5,978,126 A | 11/1999 | Sjursen et al. | |
| 6,055,089 A | 4/2000 | Schulz et al. | |
| 6,084,700 A | 7/2000 | Knapp et al. | |
| 6,130,448 A | 10/2000 | Bauer et al. | |
| 6,130,772 A | 10/2000 | Cava | |
| 6,222,177 B1 | 4/2001 | Bechtel et al. | |
| 6,262,831 B1 | 7/2001 | Bauer et al. | |
| 6,386,713 B1 | 5/2002 | Turnbull et al. | |
| 6,407,468 B1 * | 6/2002 | LeVesque et al. | 307/10.1 |
| 6,449,082 B1 | 9/2002 | Agrawal et al. | |
| 6,535,126 B2 | 3/2003 | Lin et al. | |

(Continued)

FOREIGN PATENT DOCUMENTS

EP        0 869 032        10/1998

(Continued)

*Primary Examiner* — Dawayne A Pinkney
(74) *Attorney, Agent, or Firm* — Weaver Austin Villeneuve & Sampson LLP; Brian D. Griedel

(57) ABSTRACT

Onboard EC window controllers are described. The controllers are configured in close proximity to the EC window, for example, within the IGU. The controller may be part of a window assembly, which includes an IGU having one or more EC panes, and thus does not have to be matched with the EC window, and installed, in the field. The window controllers described herein have a number of advantages because they are matched to the IGU containing one or more EC devices and their proximity to the EC panes of the window overcomes a number of problems associated with conventional controller configurations.

53 Claims, 7 Drawing Sheets

U.S. PATENT DOCUMENTS

| | | |
|---|---|---|
| 6,567,708 B1 | 5/2003 | Bechtel et al. |
| 6,614,577 B1 | 9/2003 | Yu et al. |
| 6,829,511 B2 | 12/2004 | Bechtel et al. |
| 6,856,444 B2 | 2/2005 | Ingalls et al. |
| 6,940,627 B2 | 9/2005 | Freeman et al. |
| 7,085,609 B2 | 8/2006 | Bechtel et al. |
| 7,133,181 B2 | 11/2006 | Greer |
| 7,215,318 B2 | 5/2007 | Turnbull et al. |
| 7,277,215 B2 | 10/2007 | Greer |
| 7,417,397 B2 | 8/2008 | Berman et al. |
| 7,542,809 B2 | 6/2009 | Bechtel et al. |
| 7,548,833 B2 | 6/2009 | Ahmed |
| 7,941,245 B1 | 5/2011 | Popat |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 2003/0210449 A1 | 11/2003 | Ingalls et al. |
| 2003/0210450 A1 | 11/2003 | Yu et al. |
| 2004/0001056 A1 | 1/2004 | Atherton et al. |
| 2005/0200934 A1 | 9/2005 | Callahan et al. |
| 2005/0270620 A1* | 12/2005 | Bauer et al. ................ 359/265 |
| 2005/0278047 A1 | 12/2005 | Ahmed |
| 2006/0018000 A1 | 1/2006 | Greer |
| 2006/0170376 A1* | 8/2006 | Piepgras et al. ............. 315/295 |
| 2006/0187608 A1* | 8/2006 | Stark ............................ 361/202 |
| 2006/0209007 A1 | 9/2006 | Pyo et al. |
| 2006/0245024 A1 | 11/2006 | Greer |
| 2007/0002007 A1 | 1/2007 | Tam |
| 2007/0067048 A1 | 3/2007 | Bechtel et al. |
| 2008/0018979 A1 | 1/2008 | Mahe et al. |
| 2009/0027759 A1 | 1/2009 | Albahri |
| 2009/0066157 A1 | 3/2009 | Tarng et al. |
| 2009/0143141 A1* | 6/2009 | Wells et al. .................... 463/37 |
| 2009/0243732 A1 | 10/2009 | Tarng et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0245972 A1 | 9/2010 | Wright |
| 2011/0046810 A1 | 2/2011 | Bechtel et al. |
| 2011/0063708 A1 | 3/2011 | Letocart |
| 2011/0148218 A1* | 6/2011 | Rozbicki ....................... 307/104 |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2012/0026573 A1* | 2/2012 | Collins et al. ................. 359/275 |

FOREIGN PATENT DOCUMENTS

| | | |
|---|---|---|
| EP | 2 161 615 | 3/2010 |
| EP | 2 357 544 | 8/2011 |
| JP | 63-208830 | 8/1988 |
| JP | 02-132420 | 5/1990 |
| JP | 10-063216 | 3/1998 |
| WO | WO 98/16870 | 4/1998 |
| WO | WO 2004/003649 | 1/2004 |
| WO | WO 2005/103807 | 11/2005 |
| WO | WO 2007/146862 | 12/2007 |
| WO | WO 2008/030018 | 3/2008 |
| WO | WO 2008/147322 | 12/2008 |
| WO | WO 2009/124647 | 10/2009 |
| WO | WO 2011/020478 | 2/2011 |
| WO | WO 2011/087684 | 7/2011 |
| WO | WO 2011/087687 | 7/2011 |
| WO | WO 2011/127015 | 10/2011 |

* cited by examiner

Fig. 1B *(Prior Art)*

AUTOMATED INSTALLATION

NON-AUTOMATED INSTALLATION

ONBOARD CONTROLLER FOR MULTISTATE WINDOWS

CROSS REFERENCE TO RELATED APPLICATIONS

The application is related to U.S. patent application Ser. No. 13/049,756, naming Pradhan, Mehtani, and Jack as inventors, titled "Multipurpose Controller for Multistate Windows" and filed on the same day as the present application, and is incorporated herein by reference in its entirety and for all purposes.

FIELD

The invention relates generally to electrochromic devices, more particularly to controllers for electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device (EC) of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960's, EC devices, and particularly EC windows, still unfortunately suffer various problems and have not begun to realize their full commercial potential despite many recent advancements in EC technology, apparatus and related methods of making and/or using EC devices.

SUMMARY

"Localized" controllers for EC windows are described. In some embodiments, a localized controller is an "onboard" or "in situ" controller, where the window controller is part of a window assembly and thus does not have to be matched with a window and installed in the field. The window controllers have a number of advantages because they are matched to an IGU containing one or more EC devices. Localized controllers eliminate the problematic issue of varying wire length from EC window to controller in conventional systems. In some embodiments, an in situ controller is incorporated into the IGU and/or the window frame prior to installation. As discussed in more detail below, a number of advantages and synergies are realized by localized EC window controllers, in particular, where the controller is part of a window assembly.

One embodiment is a window assembly including: at least one electrochromic (EC) pane; and a window controller configured to control the at least one EC pane of an IGU of the window assembly. Window controllers described herein can control more than one EC pane, including two, three or more EC panes in a single EC window. In one embodiment, the window controller is not positioned within the viewable area of the IGU of the window assembly.

In one embodiment, a window controller described herein can include: a power converter configured to convert a low voltage to the power requirements of the at least one EC pane; a communication circuit for receiving and sending commands to and from a remote controller (for example via a communication bus and/or a wireless transmitter), and receiving and sending input to and from; a microcontroller including a logic for controlling the at least one EC pane based at least in part by input received from one or more sensors; and a driver circuit for powering the at least one EC device. The communication circuit (i.e., communication interface) can include wireless capability. The window controller may also include a redundant driver circuit, one or more sensors, an RFID tag, and/or memory such as solid state serial memory (e.g. I2C or SPI) which may optionally be a programmable memory. When the EC window's IGU includes more than one EC pane, the controller logic can be configured to independently control each of the two EC panes. Particularly useful EC panes include all solid state and inorganic EC devices.

Another embodiment is an EC pane with an associated EC controller, where the associated EC controller is mounted on the EC pane. The EC controller may or may not extend beyond the outer perimeter of the EC pane.

Another embodiment is an IGU including a controller as described herein. Onboard controllers may be located between the panes of the IGU. In one embodiment, the controller is mounted within the secondary seal of the IGU and may or may not extend past the outer perimeter of the panes making up the IGU. In one embodiment, the shape and size of the controllers is configured to reside in between the panes of the IGU and may span one or more sides of the secondary seal, around the perimeter of the primary seal. Localized controllers may be relatively small, for example, having dimensions of 6 inches by 1 inch by 1 inch, or less, on each dimension. In one embodiment, the controller has dimensions of 5 inches by ¾ inches by ⅝ inches, or less, on each dimension.

Another embodiment is an EC window controller as described herein.

Yet another embodiment is a network of EC windows including localized, particularly in situ or onboard, window controllers as described herein.

Another embodiment is a window unit including: a substantially transparent substrate having an electrochromic device disposed thereon; and a controller integrated with the substrate in the window unit for providing optical switching control for the electrochromic device. "Integration with the substrate" means that the controller is in close proximity to, for example within 1 meter or less, or for example mounted on the substrate bearing the EC device. In one embodiment, the window unit further includes: a second substantially transparent substrate; and a sealing separator between the first and second substantially transparent substrates, which sealing separator defines, together with the first and second substantially transparent substrates, an interior region that is thermally insulating. In one embodiment, the controller is embedded in the sealing separator. In one embodiment, the controller includes control logic for directing the electrochromic device to switch between three or more optical states. In one embodiment, the controller is configured to prevent the electrochromic device from being connected to in a reverse polarity mode to an external power source. In various embodiments, the controller is configured to be powered by a source delivering between about 2 and 10 volts. The controller may include wireless communication and/or powering functions. The window unit may further include a sensor, for example housed in the window frame, in communication with the controller. Exemplary sensors include thermal sensors and optical sensors. In one embodiment, the sensor can detect a broken lead for delivering power to the electrochromic device. The controller may include a chip, a card or a board, for example a field programmable gate array.

These and other features and advantages will be described in further detail below, with reference to the associated drawings.

BRIEF DESCRIPTION OF THE DRAWINGS

The following detailed description can be more fully understood when considered in conjunction with the drawings in which:

FIG. 1B depicts a conventional wiring scheme for EC window controllers.

DETAILED DESCRIPTION

A "localized" controller, as described herein, is a window controller that is associated with, and controls, a single EC window. An EC window may include one, two, three or more individual EC panes (an EC device on a transparent substrate). The controller is generally configured in close proximity to the EC window. In certain embodiments, this means that the controller is, for example, within 1 meter of the EC window when controller is installed, in one embodiment, within 0.5 meter, in yet another embodiment, within 0.25 meter. In some embodiments, the window controller is an "in situ" controller; that is, the controller is part of a window assembly, which includes an IGU having one or more EC panes, and thus does not have to be matched with the EC window, and installed, in the field. The controller may be installed in the window frame of a window unit, or be part of the IGU, for example, mounted between panes of the IGU.

It should be understood that while the disclosed embodiments focus on electrochromic windows, the concepts may apply to other types of switchable optical devices such as liquid crystal devices and suspended particle devices.

The window controllers described herein have a number of advantages because they are matched to the IGU containing one or more EC devices. In one embodiment, the controller is incorporated into the IGU and/or the window frame prior to installation of the EC window. In one embodiment, the controller is incorporated into the IGU and/or the window frame prior to leaving the manufacturing facility. In one embodiment, the controller is incorporated into the IGU, substantially within the secondary seal. Having the controller as part of an IGU and/or a window assembly, the IGU can be characterized using logic and features of the controller that travels with the IGU or window unit. For example, when a controller is part of the IGU assembly, in the event the characteristics of the EC device(s) change over time, this characterization function can be used, for example, to redirect into which product the IGU will be incorporated. In another example, if already installed in an EC window unit, the logic and features of the controller can be used to calibrate the control parameters to match the intended installation, and for example if already installed, the control parameters can be recalibrated to match the performance characteristics of the EC pane(s).

In this application, an "IGU" includes two substantially transparent substrates, for example, two panes of glass, where at least one substrate includes an EC device disposed thereon, and the panes have a separator disposed between them. An IGU is typically hermetically sealed, having an interior region that is isolated from the ambient environment. A "window assembly" includes an IGU, and may include electrical leads for connecting the IGU's one or more EC devices to a voltage source, switches and the like, as well as a frame that supports the IGU and related wiring.

Figure 1A:
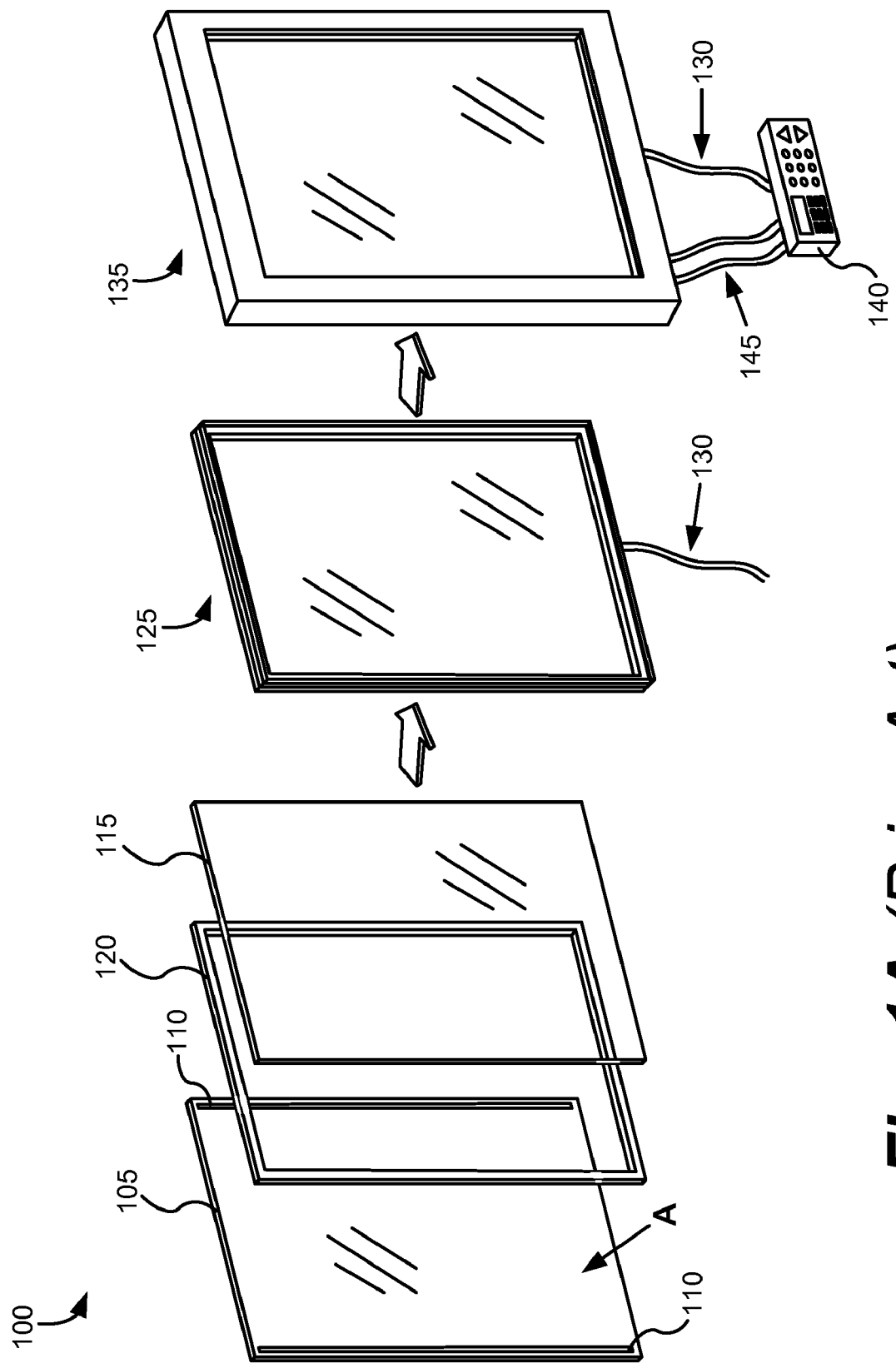
FIG. 1A depicts conventional fabrication of an IGU including an EC pane and incorporation into a window assembly.

For context, a discussion of conventional window controller technology follows. FIG. 1A depicts an EC window fabrication and control scheme, 100. An EC pane, 105, having an EC device (not shown, but for example on surface A) and bus bars, 110, which power the EC device, is matched with another glass pane, 115. During fabrication of IGU, 125, a separator, 120, is sandwiched in between and registered with substrates 105 and 115. The IGU 125 has an associated interior space defined by the faces of the substrates in contact with separator 120 and the interior surfaces of the separator. Separator 110 is typically a sealing separator, that is, includes a spacer and sealing between the spacer and each substrate where they adjoin in order to hermetically seal the interior region and thus protect the interior from moisture and the like. Typically, once the glass panes are sealed to the separator, secondary sealing may be applied around the perimeter edges of the IGU in order to impart further sealing from the ambient, as well as further structural rigidity to the IGU. The IGU 125 must be wired to a controller via wires, 130. The IGU is supported by a frame to create a window assembly, 135. Window assembly 135 is connected, via wires 130, to a controller, 140. Controller 140 may also be connected to one or more sensors in the frame via communication lines 145.

As depicted in FIG. 1A, conventional EC window controllers are not part of the window assembly itself and thus it is required that the controllers are installed outside of the IGU and/or window assembly. Also, conventional window controllers are calibrated to the EC window they control at the installation site, putting more burden on the installer. Consequently, there are more parts to ship from the manufacturer to the installation site, and this has associated tracking pitfalls, for example, mismatching of window and associated controller. Mismatched controller and window can cause installation delays as well as damage to the controller and/or IGU. All these factors contribute to higher cost of EC windows. Also, since conventional controllers are remotely located, long and differing lengths of low voltage (e.g. less than 10 v DC) wiring and thus are wired to one or more EC windows as part of the installation of the EC windows. For example, referring to FIG. 1B, controllers 140 each control an EC window 135.

Typically the controllers are located proximate to a single location and so low voltage wiring 130 is of varying length. This is true even if there is only one controller that controls multiple windows. There are associated current drop offs and losses due to this long wiring. Also, since the controller is located remotely, any control feedback or diagnostic sensors mounted in the window assembly require separate wiring to be run to the controller—increasing cost and complexity of installation. Also, any identification numbers on the IGU are hidden by the frame and may not be easily accessible, which makes it problematic to check IGU information, for example, checking warranty or other vendor information.

In one embodiment, localized controllers are installed as part of the wall of the room in which the associated window's or IGU's will be installed. That is, the controllers are installed in the framing and/or wall materials proximate (according to the distances described herein) to where their associated window units or IGU's will be installed. This may be in materials that will ultimately be part of the wall, where a separate window frame and IGU (a window unit) is to be installed, or the controller may be installed in framing materials that will serve, at least partially, as the frame for the EC window, where the IGU's are installed into the framing to complete an IGU and controller proximity matching. Thus, one embodiment is a method of installing an EC window and associated controller unit into a wall, the method including (a) installing the associated controller unit into a wall, and (b) installing either an EC window unit which includes a window frame of the EC window, or installing an IGU, where the wall framing serves as the frame for the EC window.

In one embodiment, controllers described herein are part of a window assembly. One embodiment is a window unit including: a substantially transparent substrate having an electrochromic device disposed thereon; and a controller integrated with the substrate in the window unit for providing optical switching control for the electrochromic device. In one embodiment, the window unit further includes: a second substantially transparent substrate; and a sealing separator between the first and second substantially transparent substrates, which sealing separator defines, together with the first and second substantially transparent substrates, an interior region that is thermally insulating. In one embodiment, the controller is embedded in the sealing separator. In one embodiment, the controller includes control logic for directing electrochromic device to switch between three or more optical states. In one embodiment, the controller is configured to prevent the electrochromic device from being connected to in a reverse polarity mode to an external power source. In one embodiment, the controller is configured to be powered by a source delivering between about 2 and 10 volts. There can be included in the window assembly, supply lines for delivering both power and communications to the controller or only power where the controller includes wireless communication capability.

In one embodiment, the window assembly includes an IGU with at least one EC pane; and a window controller configured to control the at least one EC pane of the IGU of the window assembly. Preferably, but not necessarily, the window controller is not positioned within the viewable area of the IGU. In one embodiment, the window controller is positioned outside of the primary seal of the IGU. The controller could be in the window frame and/or in between the panes of the IGU. In one embodiment, the window controller is included with the IGU. That is, the IGU, which includes a "window unit" including two (or more) panes and a separator, also includes the window controller. In one embodiment, the window controller is positioned at least partially between the individual panes of the IGU, outside of the primary seal. In one embodiment, the window controller may span a distance from a point between the two panes of the IGU and a point beyond the panes, for example, so that the portion that extends beyond the panes resides in, at least partially, the frame of the window assembly.

In one embodiment, the window controller is in between and does not extend beyond the individual panes of the IGU. This configuration is desirable because the window controller can be, for example, wired to the EC device(s) of the EC panes of the IGU and included in the secondary sealing of the IGU. This incorporates the window controller into the secondary seal; although it may be partially exposed to the ambient for wiring purposes. In one embodiment, the controller may only need a power socket exposed, and thus be "plugged in" to a low voltage source (for example a 24 v source) because the controller communicates otherwise via wireless technology and/or through the power lines (e.g. like Ethernet over power lines). The wiring from the controller to the EC device, for example between 2 v and 10 v, is minimized due to the proximity of the controller to the EC device.

Electrochromic windows which are suitable for use with controllers described herein include, but are not limited to, EC windows having one, two or more electrochromic panes. Windows having EC panes with EC devices thereon that are all solid state and inorganic EC devices are particularly well suited for controllers described herein due to their excellent switching and transition characteristics as well as low defectivity. Such windows are described in the following U.S. patent application Ser. No. 12/645,111, entitled, "Fabrication of Low-Defectivity Electrochromic Devices," filed on Dec. 22, 2009 and naming Mark Kozlowski et al. as inventors; Ser. No. 12/645,159, entitled, "Electrochromic Devices," filed on Dec. 22, 2009 and naming Zhongchun Wang et al. as inventors; Ser. Nos. 12/772,055 and 12/772,075, each filed on Apr. 30, 2010, and in U.S. patent application Ser. Nos. 12/814,277 and 12/814,279, each filed on Jun. 11, 2010—each of the latter four applications is entitled "Electrochromic Devices," each names Zhongchun Wang et al. as inventors; Ser. No. 12/851,514, filed on Aug. 5, 2010, and entitled "Multipane Electrochromic Windows," each of which is incorporated by reference herein for all purposes. As mentioned, the controllers disclosed herein may useful for switchable optical devices that are not electrochromic devices. Such alternative devices include liquid crystal devices and suspended particle devices.

In certain embodiments, the EC device or devices of the EC windows face the interior region of the IGU to protect them from the ambient. In one embodiment, the EC window includes a two-state EC device. In one embodiment, the EC window has only one EC pane, the pane may have a two-state (optical) EC device (colored or bleached states) or a device that has variable transitions. In one embodiment, the window includes two EC panes, each of which includes a two-state device thereon and the IGU has two optical states, in another embodiment, the IGU has four optical states. In one embodiment, the four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%. In one embodiment, the EC window has one pane with an EC device having two states and another pane with an EC device with variable optical state capability. In one embodiment, the EC window has two EC panes, each having an EC device with variable optical state capability. In one embodiment, the EC window includes three or more EC panes.

In certain embodiments, the EC windows are low-defectivity windows. In one embodiment, the total number of visible defects, pinholes and short-related pinholes created from isolating visible short-related defects in an EC device of the EC window is less than about 0.1 defects per square centimeter, in another embodiment, less than about 0.045 defects per square centimeter.

Figure 2A:
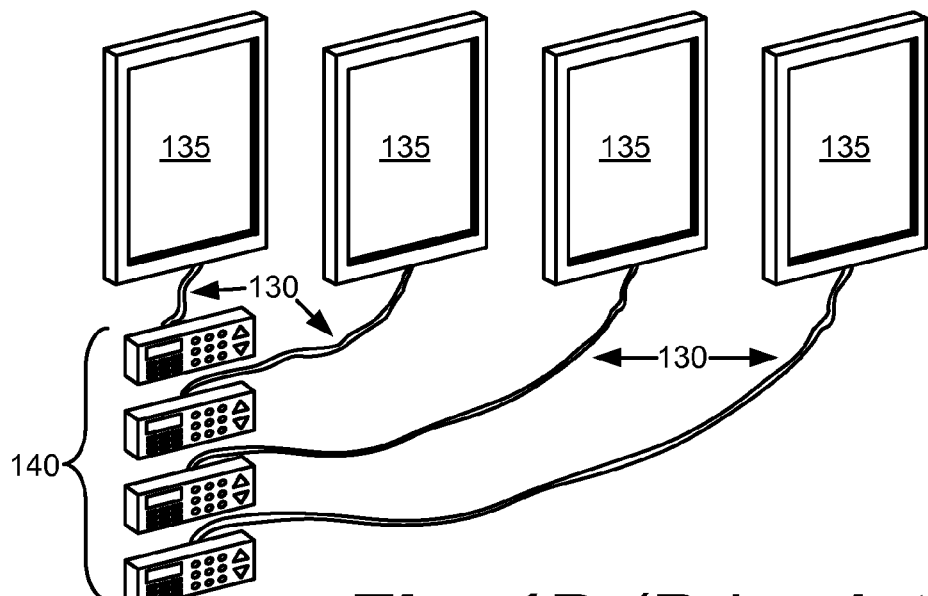
FIG. 2A is a schematic of a window assembly with an IGU having an onboard controller.
Figure 2A:
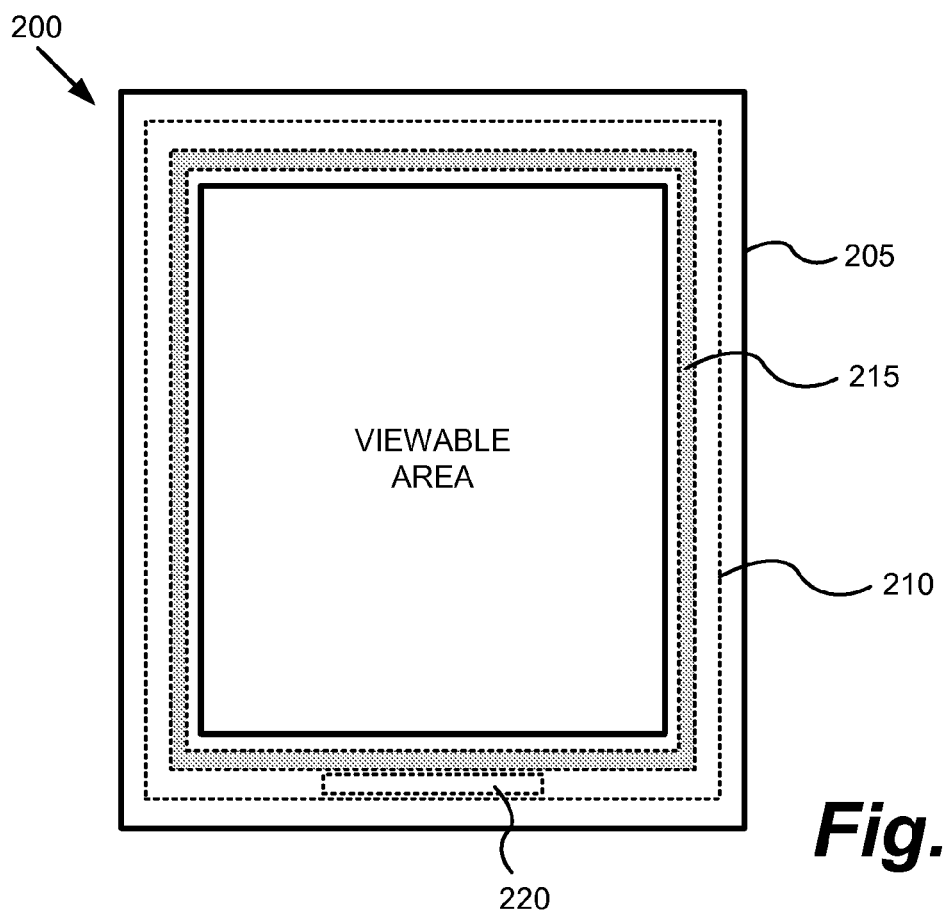

FIG. 2A depicts a window assembly, 200, including a window frame, 205. The viewable area of the window unit is indicated on the figure, inside the perimeter of frame 205. As indicated by dotted lines, inside frame 205, is an IGU, 210, which includes two glass panes separated by a sealing separator, 215, shaded in gray. Window controller, 220, is between the glass panes of IGU 210 and, in this example, does not extend beyond the perimeter of the glass panes of the IGU. The window controller need not be incorporated into a single enclosure as depicted, and need not be along a single edge of the IGU. For example, in one embodiment, the controller resides along two, three or four edges of the IGU, in some instances, all within the secondary seal zone. In some embodiments, the window controller can extend beyond the perimeter of the IGU and into the frame of the window assembly.

There are advantages to having the window controller positioned in the frame of the window assembly, particularly in the secondary seal zone of an IGU, some of these include: 1) wiring from the controller to one or more EC devices of the IGU panes is very short, and consistent from window to window for a given installation, 2) any custom pairing and tuning of controller and IGU can be done at the factory without chances of mis-pairing controller and window in the field, 3) even if there are no mismatches, there are fewer parts to ship, track and install, 4) there is no need for a separate housing and installation for the controller, because the components of the controller can be incorporated into the secondary seal of the IGU, 5) wiring coming to the window can be higher voltage wiring, for example 24V or 48V, and thus line losses seen in lower voltage lines (e.g. less than 10V DC) are obviated, 6) this configuration allows in-situ connection to control feedback and diagnostic sensors, obviating the need for long wiring to remote controllers, and 7) the controller can store pertinent information about the IGU, for example using an RFID tag and/or memory such as solid state serial memory (e.g. I2C or SPI) which may optionally be programmable. Stored information may include, for example, the manufacturing date, batch ID, window size, warranty information, EC device cycle count, current detected window condition (e.g., applied voltage, temperature, % Tvis), window drive configuration parameters, controller zone membership, and like information, which will be further described below. These benefits save time, money and installation downtime, as well as providing more design flexibility for control and feedback sensing. More details of the window controller are described below.

One embodiment is a window assembly (or IGU) having at least one EC pane, where the window assembly (or IGU) includes a window controller. In one embodiment, the window controller includes: a power converter configured to convert a low voltage, for example 24V, to the power requirements of said at least one EC pane, for example between 2V and 10V; a communication circuit for receiving and sending commands to and from a remote controller, and receiving and sending input to and from; a microcontroller comprising a logic for controlling said at least one EC pane based at least in part by input received from one or more sensors; and a driver circuit for powering said at least one EC device.

Figure 2B:
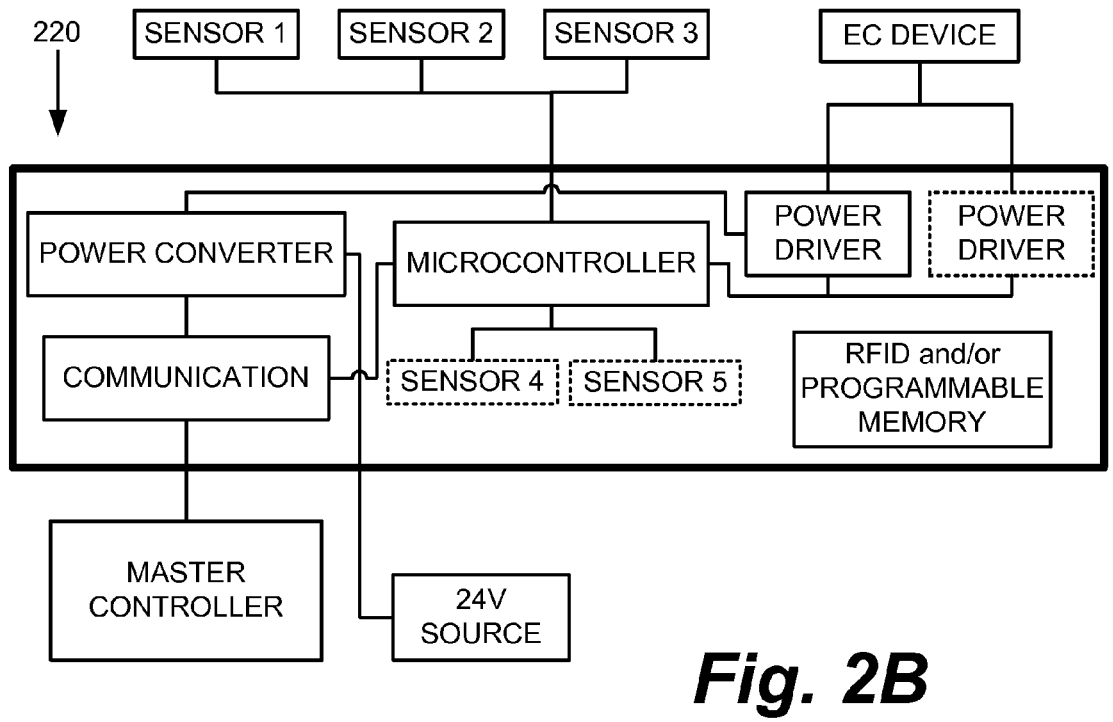
FIG. 2B is a schematic of an onboard window controller.

FIG. 2B, depicts an example window controller 220 in some detail. Controller 220 includes a power converter configured to convert a low voltage to the power requirements of an EC device of an EC pane of an IGU. This power is typically fed to the EC device via a driver circuit (power driver). In one embodiment, controller 220 has a redundant power driver so that in the event one fails, there is a back up and the controller need not be replaced or repaired.

Controller 220 also includes a communication circuit (labeled "communication" in FIG. 2B) for receiving and sending commands to and from a remote controller (depicted in FIG. 2B as "master controller"). The communication circuit also serves to receive and send input to and from a microcontroller. In one embodiment, the power lines are also used to send and receive communications, for example, via protocols such as ethernet. The microcontroller includes a logic for controlling the at least one EC pane based, at least in part, by input received from one or more sensors. In this example sensors 1-3 are, for example, external to controller 220, for example in the window frame or proximate the window frame. In one embodiment, the controller has at least one or more internal sensors. For example, controller 220 may also, or in the alternative, have "onboard" sensors 4 and 5. In one embodiment, the controller uses the EC device as a sensor, for example, by using current-voltage (I/V) data obtained from sending one or more electrical pulses through the EC device and analyzing the feedback. This type of sensing capability is described in U.S. patent application Ser. No. 13/049,756 naming Brown et al. as inventors, titled "Multipurpose Controller for Multistate Windows" and filed on the same day as the present application, which is incorporated by reference herein for all purposes.

In one embodiment, the controller includes a chip, a card or a board which includes appropriate logic, programmed and/or hard coded, for performing one or more control functions. Power and communication functions of controller 220 may be combined in a single chip, for example, a programmable logic device (PLD) chip, field programmable gate array (FPGA) or similar device. Such integrated circuits can combine logic, control and power functions in a single programmable chip. In one embodiment, where the EC window (or IGU) has two EC panes, the logic is configured to independently control each of the two EC panes. In one embodiment, the function of each of the two EC panes is controlled in a synergistic fashion, that is, so that each device is controlled in order to complement the other. For example, the desired level of light transmission, thermal insulative effect, and/or other property are controlled via combination of states for each of the individual devices. For example, one EC device may have a colored state while the other is used for resistive heating, for example, via a transparent electrode of the device. In another example, the two EC device's colored states are controlled so that the combined transmissivity is a desired outcome.

Controller 220 may also have wireless capabilities, such as control and powering functions. For example, wireless controls, such as Rf and/or IR can be used as well as wireless communication such as Bluetooth, WiFi, Zigbee, EnOcean and the like to send instructions to the microcontroller and for the microcontroller to send data out to, for example, other window controllers and/or a building management system (BMS). Wireless communication can be used in the window controller for at least one of programming and/or operating the EC window, collecting data from the EC window from sensors as well as using the EC window as a relay point for wireless communication. Data collected from EC windows also may include count data such as number of times an EC device has been activated (cycled), efficiency of the EC device over time, and the like. Each of these wireless communication features is described in U.S. patent application Ser. No. 13/049,756, naming Brown et al. as inventors, titled "Multipurpose Controller for Multistate Windows" and filed on the same day as the present application, which was incorporated by reference above.

Also, controller 220 may have wireless power function. That is, controller 220 may have one or more wireless power receivers, that receive transmissions from one or more wireless power transmitters and thus controller 220 can power the EC window via wireless power transmission. Wireless power transmission includes, for example but not limited to, induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dual polarized waves, and/or various frequencies and vectors. In another embodiment, power is wirelessly transferred via inductive coupling of magnetic fields. Exemplary wireless power functions of electrochromic windows is described in U.S. patent application Ser. No. 12/971,576, filed Dec. 17, 2010, titled "Wireless Powered Electrochromic Windows", and naming Robert Rozbicki as inventor, which is incorporated by reference herein in its entirety.

Controller 220 may also include an RFID tag and/or memory such as solid state serial memory (e.g. I2C or SPI) which may optionally be a programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

Most RFID tags contain at least two parts. One is an integrated circuit for storing and processing information, modulating and demodulating a radio-frequency (Rf) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range. RFID has many applications; for example, it is used in enterprise supply chain management to improve the efficiency of inventory tracking and management.

In one embodiment, the RFID tag or other memory is programmed with at least one of the following types of data: warranty information, installation information, vendor information, batch/inventory information, EC device/IGU characteristics, EC device cycling information and customer information. Examples of EC device characteristics and IGU characteristics include, for example, window voltage ($V_W$), window current ($I_W$), EC coating temperature ($T_{EC}$), glass visible transmission (% $T_{vis}$), % tint command (external analog input from BMS), digital input states, and controller status. Each of these represents upstream information that may be provided from the controller to a BMS or window management system or other building device. The window voltage, window current, window temperature, and/or visible transmission level may be detected directly from sensors on the windows. The % tint command may be provided to the BMS or other building device indicating that the controller has in fact taken action to implement a tint change, which change may have been requested by the building device. This can be important because other building systems such as HVAC systems might not recognize that a tint action is being taken, as a window may require a few minutes (e.g., 10 minutes) to change state after a tint action is initiated. Thus, an HVAC action may be deferred for an appropriate period of time to ensure that the tinting action has sufficient time to impact the building environment. The digital input states information may tell a BMS or other system that a manual action relevant to the smart window has been taken. See block 504 in FIG. 5A. Finally, the controller status may inform the BMS or other system that the controller in question is operational, or not, or has some other status relevant to its overall functioning.

Examples of downstream data from a BMS or other building system that may be provided to the controller include window drive configuration parameters, zone membership (e.g. what zone within the building is this controller part of), % tint value, digital output states, and digital control (tint, bleach, auto, reboot, etc.). The window drive parameters may define a control sequence (effectively an algorithm) for changing a window state. Examples of window drive configuration parameters include bleach to color transition ramp rate, bleach to color transition voltage, initial coloration ramp rate, initial coloration voltage, initial coloration current limit, coloration hold voltage, coloration hold current limit, color to bleach transition ramp rate, color to bleach transition voltage, initial bleach ramp rate, initial bleach voltage, initial bleach current limit, bleach hold voltage, bleach hold current limit. Examples of the application of such window drive parameters are presented in U.S. patent application Ser. No. 13/049,623, naming Pradhan, Mehtani, and Jack as inventors, titled "Controlling Transitions In Optically Switchable Devices" and filed on the same day as the present application, which is incorporated herein by reference in its entirety.

The % tint value may be an analog or digital signal sent from the BMS or other management device instructing the onboard controller to place its window in a state corresponding to the % tint value. The digital output state is a signal in which the controller indicates that it has taken action to begin tinting. The digital control signal indicates that the controller has received a manual command such as would be received from an interface 504 as shown in FIG. 5B. This information can be used by the BMS to, for example, log manual actions on a per window basis.

In one embodiment, a programmable memory is used in controllers described herein. This programmable memory can be used in lieu of, or in conjunction with, RFID technology. Programmable memory has the advantage of increased flexibility for storing data related to the IGU to which the controller is matched.

Figure 3:
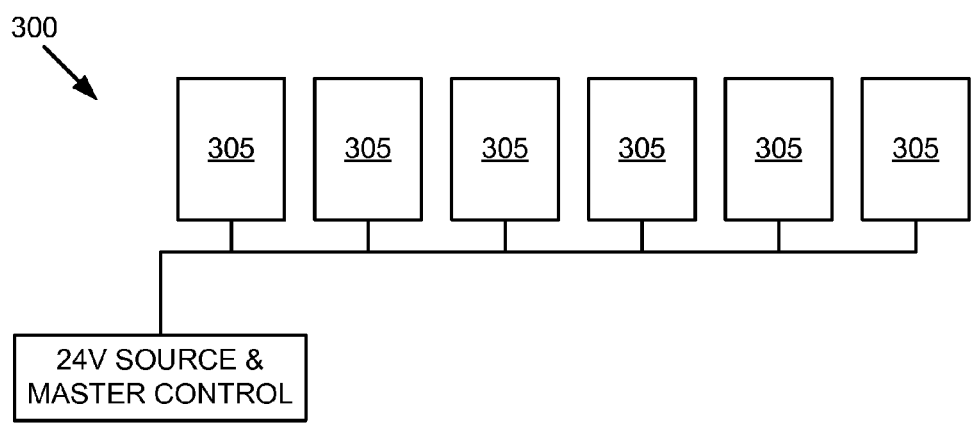
FIG. 3 depicts a wiring scheme including EC windows with onboard window controllers.
Figure 4:
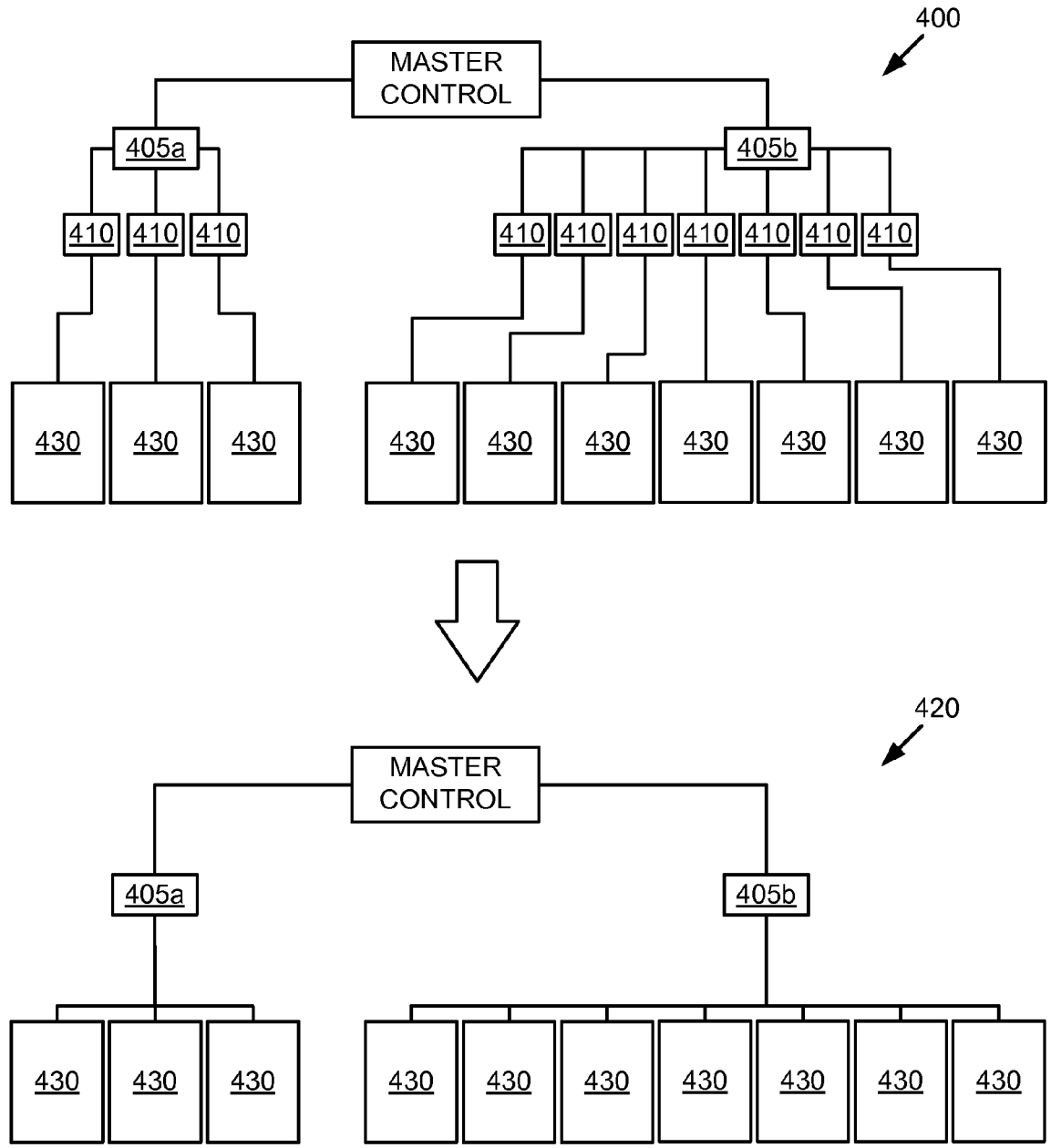
FIG. 4 depicts a distributed network of EC window controllers with conventional end or leaf controllers as compared to a distributed network with EC windows having onboard controllers

Advantages of "localized" controllers, particularly "in situ" or "onboard" controllers, described herein are further described in relation to FIGS. 3 and 4. FIG. 3 depicts an arrangement, 300, including EC windows, 305, each with an associated localized or onboard window controller (not shown). FIG. 3 illustrates that with onboard controllers, wiring, for example for powering and controlling the windows, is very simplified versus, for example, conventional wiring as depicted in FIG. 1B. In this example, a single power source, for example low voltage 24V, can be wired throughout a building which includes windows 305. There is no need to calibrate various controllers to compensate for variable wiring lengths and associated lower voltage (e.g. less than 10V DC) to each of many distant windows. Because there are not long runs of lower voltage wiring, losses due to wiring length are reduced or avoided, and installation is much easier and modular. If the window controller has wireless communication and control, or uses the power lines for communication functions, for example ethernet, then only a single voltage power wiring need be strung through the building. If the controller also has wireless power transmission capabilities, then no wiring is necessary, since each window has its own controller.

FIG. 4 depicts a distributed network, 400, of EC window controllers with conventional end or leaf controllers as compared to a distributed network, 420, with EC windows having onboard controllers. Such networks are typical in large commercial buildings that may include smart windows.

In network 400, a master controller controls a number of intermediate controllers, 405a and 405b. Each of the intermediate controllers in turn controls a number of end or leaf controllers, 410. Each of controllers 410 controls an EC window. Network 400 includes the long spans of lower DC voltage, for example a few volts, wiring and communication cables from each of leaf controllers 410 to each window 430. In comparison, by using onboard controllers as described herein, network 420 eliminates huge amounts of lower DC voltage wiring between each end controller and its respective window. Also this saves an enormous amount of space that would otherwise house leaf controllers 410. A single low voltage, e.g. from a 24 v source, is provided to all windows in the building, and there is no need for additional lower voltage wiring or calibration of many windows with their respective controllers. Also, if the onboard controllers have wireless communication function or capability of using the power wires, for example as in ethernet technology, there is no need for extra communication lines between intermediate controllers 405a and 405b and the windows.

Figure 5A:
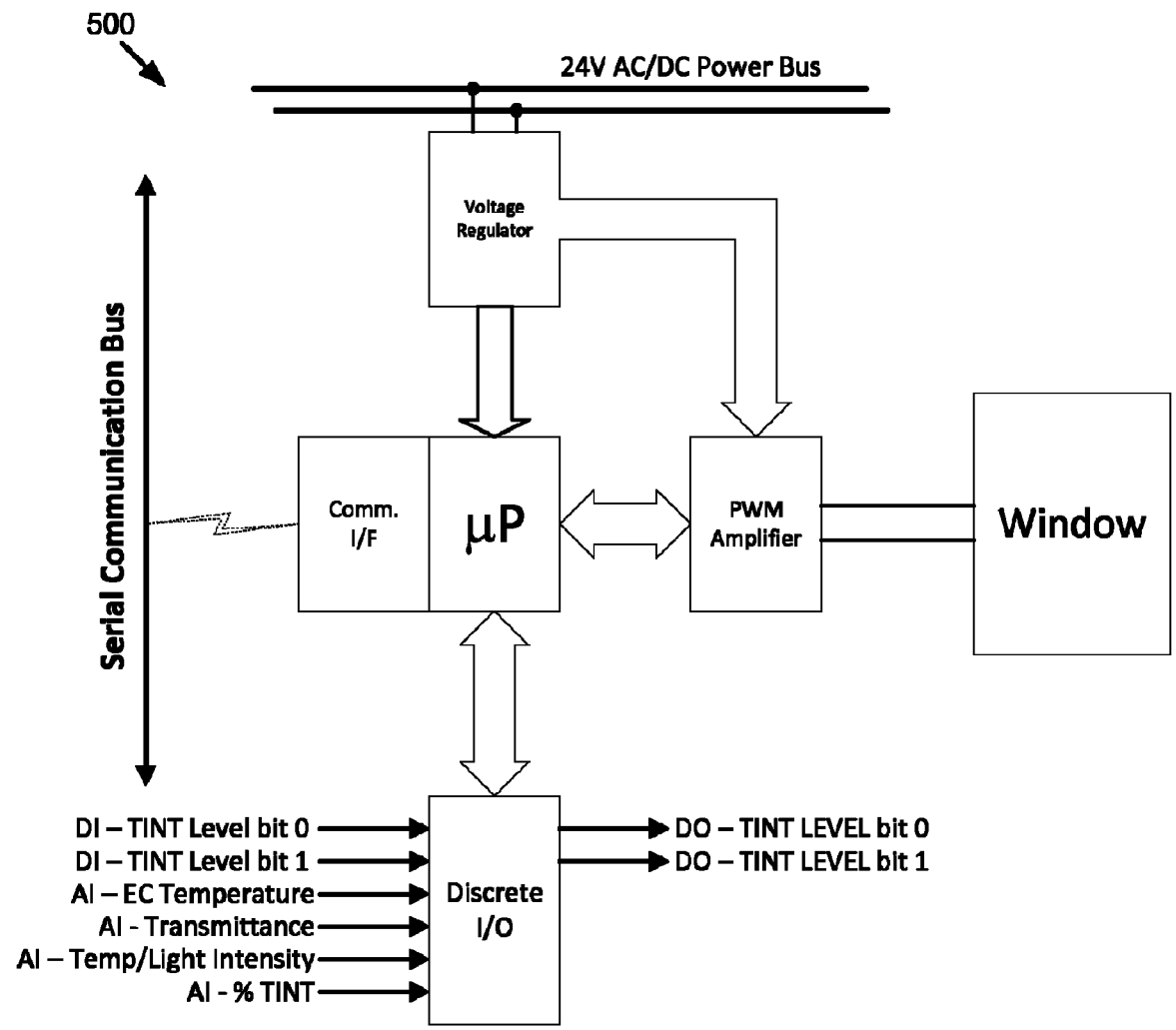
FIG. 5A is a schematic of an onboard window controller.
Figure 5B:
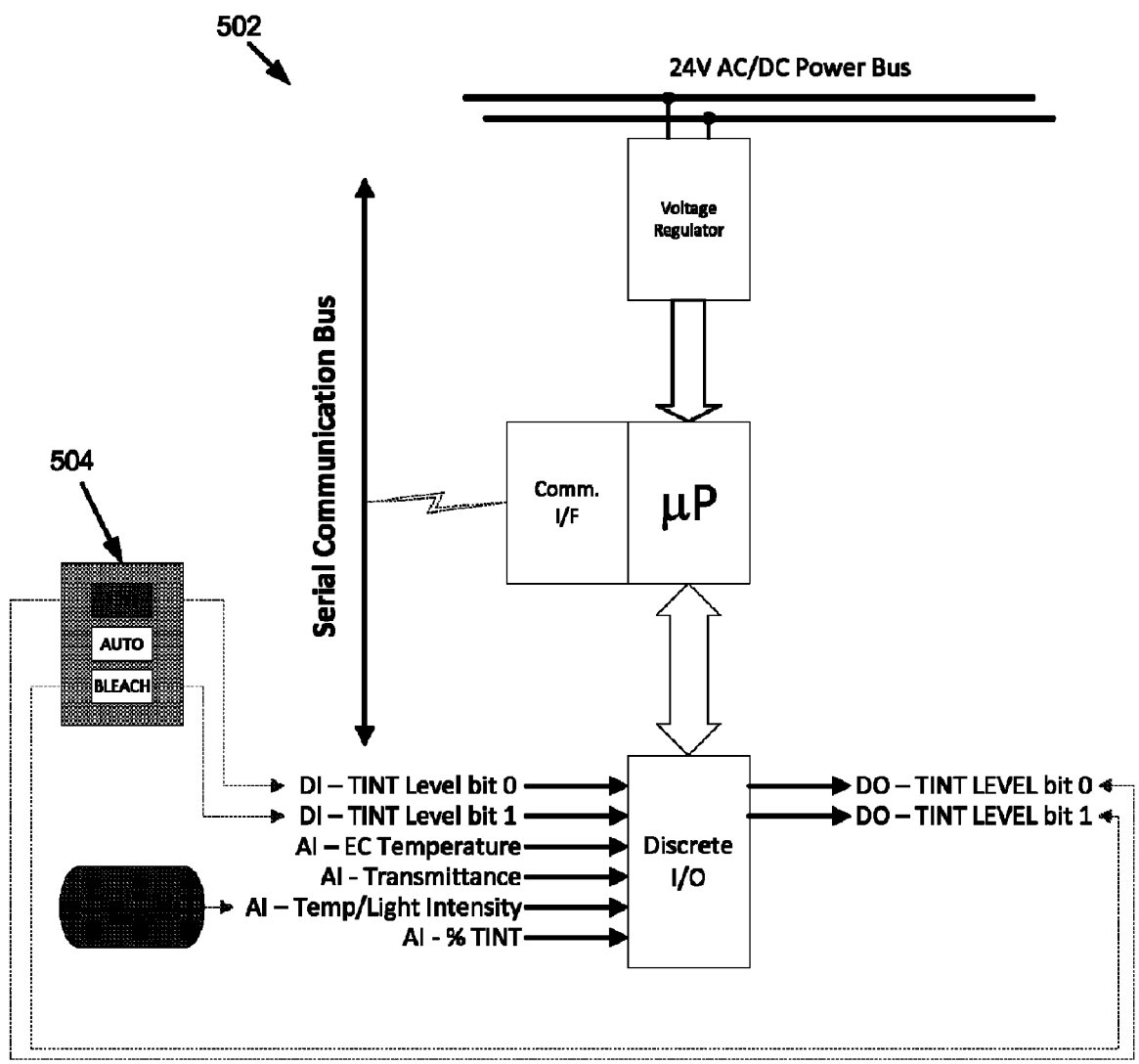
FIG. 5B depicts a user interface for localized controllers described herein.

FIG. 5A is a schematic depiction of an onboard window controller configuration, 500, including interface for integration of EC windows into, for example, a residential system or a building management system. A voltage regulator accepts power from a standard 24 v AC/DC source. The voltage regulator is used to power a microprocessor (μP) as well as a pulse width modulated (PWM) amplifier which can generate current at high and low output levels, for example, to power an associated smart window. A communications interface allows, for example, wireless communication with the controller's microprocessor. In one embodiment, the communication interface is based on established interface standards, for example, in one embodiment the controller's communication interface uses a serial communication bus which may be the CAN 2.0 physical layer standard introduced by Bosch widely used today for automotive and industrial applications. "CAN" is a linear bus topology allowing for 64 nodes (window controllers) per network, with data rates of 10 kbps to 1 Mbps, and distances of up to 2500 m. Other hard wired embodiments include MODBUS, LonWorks™, power over Ethernet, BACnet MS/TP, etc. The bus could also employ wireless technology (e.g. Zigbee, Bluetooth, etc.).

In the depicted embodiment, the controller includes a discrete input/output (DIO) function, where a number of inputs, digital and/or analog, are received, for example, tint levels, temperature of EC device(s), % transmittance, device temperature (for example from a thermistor), light intensity (for example from a LUX sensor) and the like. Output includes tint levels for the EC device(s). The configuration depicted in FIG. 5A is particularly useful for automated systems, for example, where an advanced BMS is used in conjunction with EC windows having EC controllers as described herein. For example, the bus can be used for communication between a BMS gateway and the EC window controller communication interface. The BMS gateway also communicates with a BMS server.

Some of the functions of the discrete I/O will now be described.

DI-TINT Level bit 0 and DI-TINT Level bit 1: These two inputs together make a binary input (2 bits or $2^2=4$ combinations; 00, 01, 10 and 11) to allow an external device (switch or relay contacts) to select one of the four discrete tint states for each EC window pane of an IGU. In other words, this embodiment assumes that the EC device on a window pane has four separate tint states that can be set. For IGUs containing two window panes, each with its own four-state TINT Level, there may be as many as eight combinations of binary input. See U.S. patent application Ser. No. 12/851,514, filed on Aug. 5, 2010 and previously incorporated by reference. In some embodiments, these inputs allow users to override the BMS controls (e.g. untint a window for more light even though the BMS wants it tinted to reduce heat gain).

AI-EC Temperature: This analog input allows a sensor (thermocouple, thermister, RTD) to be connected directly to the controller for the purpose of determining the temperature of the EC coating. Thus temperature can be determined directly without measuring current and/or voltage at the window. This allows the controller to set the voltage and current parameters of the controller output, as appropriate for the temperature.

AI-Transmittance: This analog input allows the controller to measure percent transmittance of the EC coating directly. This is useful for the purpose of matching multiple windows that might be adjacent to each other to ensure consistent visual appearance, or it can be used to determine the actual state of the window when the control algorithm needs to make a correction or state change. Using this analog input, the transmittance can be measured directly without inferring transmittance using voltage and current feedback.

AI-Temp/Light Intensity: This analog input is connected to an interior room or exterior (to the building) light level or temperature sensor. This input may be used to control the desired state of the EC coating several ways including the following: using exterior light levels, tint the window (e.g. bright outside, tint the window or vice versa); using and exterior temperature sensor, tint the window (e.g. cold outside day in Minneapolis, untint the window to induce heat gain into the room or vice versa, warm day in Phoenix, tint the widow to lower heat gain and reduce air conditioning load).

AI-% Tint: This analog input may be used to interface to legacy BMS or other devices using 0-10 volt signaling to tell the window controller what tint level it should take. The controller may choose to attempt to continuously tint the window (shades of tint proportionate to the 0-10 volt signal, zero volts being fully untinted, 10 volts being fully tinted) or to quantize the signal (0-0.99 volt means untint the window, 1-2.99 volts means tint the window 5%, 3-4.99 volts equals 40% tint, and above 5 volts is fully tinted). When a signal is present on this interface it can still be overridden by a command on the serial communication bus instructing a different value.

DO-TINT LEVEL bit 0 and bit 1: This digital input is similar to DI-TINT Level bit 0 and DI-TINT Level bit 1. Above, these are digital outputs indicating which of the four states of tint a window is in, or being commanded to. For example if a window were fully tinted and a user walks into a room and wants them clear, the user could depress one of the switches mentioned and cause the controller to begin untinting the window. Since this transition is not instantaneous, these digital outputs will be alternately turned on and off signaling a change in process and then held at a fixed state when the window reaches its commanded value.

FIG. 5B depicts an onboard controller configuration 502 having a user interface. For example where automation is not required, the EC window controller, for example as depicted in FIG. 5A, can be populated without the PWM components and function as I/O controller for an end user where, for example, a keypad, 504, or other user controlled interface is available to the end user to control the EC window functions. The EC window controller and optionally I/O controllers can be daisy chained together to create networks of EC windows, for automated and non-automated EC window applications.

Figure 6A:
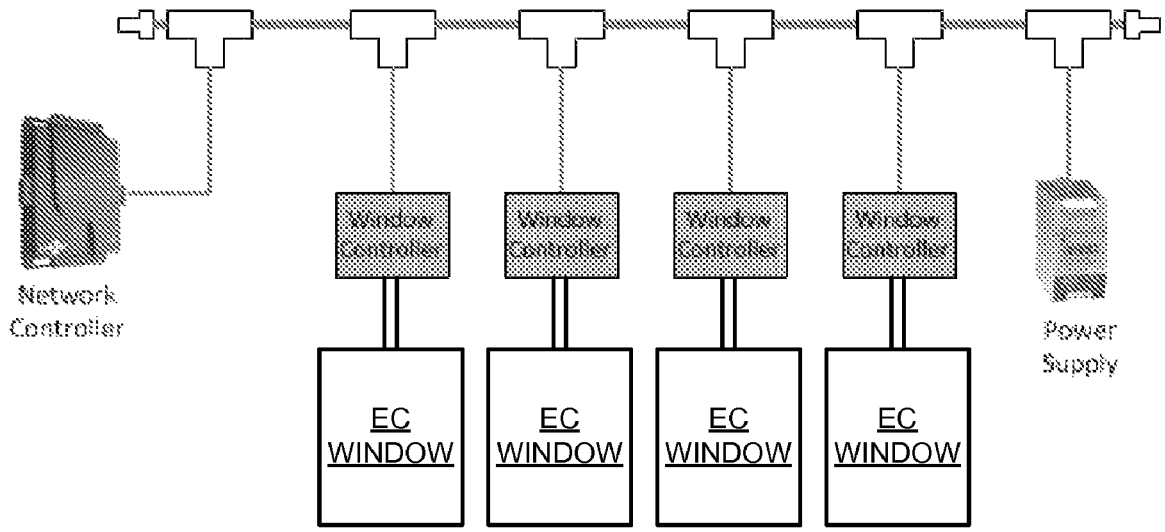
FIGS. 6A and 6B depict automated and non-automated daisy chain configurations for EC windows and controllers, respectively.
Figure 6B:
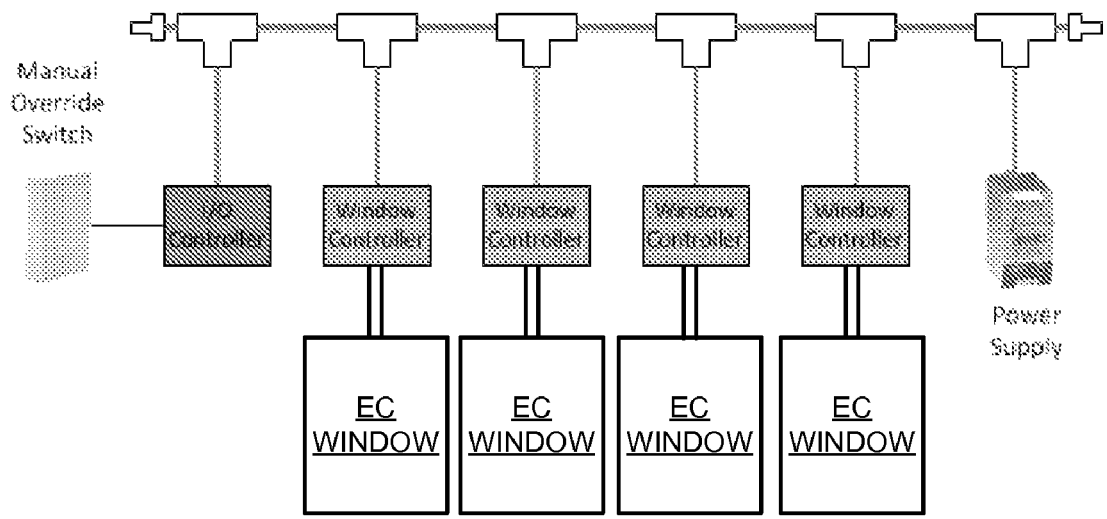

FIGS. 6A and 6B depict automated and non-automated daisy chain configurations for EC windows and EC window controllers described herein. Where automation is desired (see FIG. 6A), for example, a bus allows setting and monitoring individual window parameters and relaying that information though the network controller directly to a BMS via, for example, an Ethernet gateway. In one embodiment, a network controller contains an embedded web server for local control via Ethernet from, for example, a PC or smart phone. In one embodiment, network commissioning is done via a controller's web server and a window scheduler, for example, where HVAC and lighting programs execute locally on the controller. In one embodiment, network controllers can wirelessly connect to each other via, for example, a Zigbee mesh network, allowing for expansion for large numbers of windows or to create control zones within a building using sets of windows. As depicted in FIG. 6B, when no automation is required, window control is accomplished through an I/O controller as described above. In one embodiment, there is also a master override included. In one embodiment, a network, for example a daisy chain network as depicted in FIG. 6A or 6B, is constructed onsite (field wired). In another embodiment, commercially available cabling products (no tooling required) are used to construct a network of window controllers, for example, interconnects, cable assemblies, tees, hubs and the like are widely available from commercial suppliers.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A window assembly comprising:
   at least one electrochromic (EC) pane;
   a window controller configured to control said at least one EC pane of an IGU of the window assembly; and
   a secondary seal of the IGU, which secondary seal incorporates the window controller.

2. The window assembly of claim 1, wherein the window controller is not positioned within the viewable area of the IGU.

3. The window assembly of claim 2, wherein the window controller is positioned outside of the primary seal of the IGU.

4. The window assembly of claim 3, wherein the window controller does not extend beyond the individual panes of the IGU.

5. The window assembly of claim 1, wherein the window controller comprises:
   a power converter configured to convert a low voltage to the power requirements of said at least one EC pane;
   a communication circuit for receiving and sending commands to and from a remote controller, and receiving and sending input to and from a microcontroller; the microcontroller comprising a logic for controlling said at least one EC pane based at least in part by input received from one or more sensors; and
   a driver circuit for powering said at least one EC device.

6. The window assembly of claim 5, wherein the communication circuit comprises wireless capability.

7. The window assembly of claim 5, wherein the window controller further comprises a redundant driver circuit.

8. The window assembly of claim 5, wherein at least one of said one or more sensors are part of the window controller.

9. The window assembly of claim 5, wherein the window controller further comprises an RFID tag and/or memory.

10. The window assembly of claim 9, wherein the window controller comprises an actively powered RFID tag.

11. The window assembly of claim 9, wherein the window controller comprises a passively powered RFID tag.

12. The window assembly of claim 9, wherein said RFID tag and/or memory is programmed with at least one of the following data: warranty information, installation information, vendor information, batch/inventory information, EC device/IGU characteristics, an EC device cycle count, and customer information.

13. The window assembly of claim 5, wherein the IGU comprises two EC panes and wherein the logic is configured to independently control each of the two EC panes.

14. The window assembly of claim 10, wherein each of the two EC panes comprises an EC device that is all solid state and inorganic.

15. The window assembly of claim 11, wherein the EC device of each of the two EC panes faces the interior region of the IGU.

16. The window assembly of claim 15, wherein at least one of the EC devices is a two-state EC device.

17. The window assembly of claim 16, wherein both of the EC devices are two-state EC devices and the IGU has two optical states.

18. The window assembly of claim 16, wherein both of the EC devices are two-state EC devices and the IGU has four optical states.

19. The window assembly of claim 18, wherein the four optical states are:
   i) overall transmittance of between about 60% and about 90%;
   ii) overall transmittance of between about 15% and about 30%;
   iii) overall transmittance of between about 5% and about 10%; and
   iv) overall transmittance of between about 0.1% and about 5%.

20. An IGU comprising:
   at least one electrochromic (EC) pane;
   a window controller configured to control said at least one EC pane of the IGU; and
   a secondary seal incorporating the window controller.

21. The IGU of claim 20, wherein the window controller is positioned outside of the primary seal of the IGU.

22. The IGU of claim 21, wherein the window controller does not extend beyond the individual panes of the IGU.

23. The IGU of claim 21, wherein the window controller comprises:
   a power converter configured to convert a low voltage to the power requirements of said at least one EC pane;
   a communication circuit for receiving and sending commands to and from a remote controller, and receiving and sending input to and from a microcontroller; the microcontroller comprising a logic for controlling said at least one EC pane based at least in part by input received from one or more sensors; and a driver circuit for powering said at least one EC device.

24. The IGU of claim 23, wherein the communication circuit comprises wireless capability.

25. The IGU of claim 23, wherein the window controller further comprises a redundant driver circuit.

26. The IGU of claim 23, wherein at least one of said one or more sensors are part of the window controller.

27. The IGU of claim 23, wherein the window controller further comprises an RFID tag and/or memory.

28. The IGU of claim 27, wherein the RFID tag and/or memory is programmed with at least one of the following data: warranty information, installation information, vendor information, batch/inventory information, EC device/IGU characteristics, an EC device cycle count, and a customer information.

29. The IGU of claim 20, comprising two EC panes.

30. The IGU of claim 29, wherein the logic is configured to independently control each of the two EC panes.

31. The IGU of claim 29, wherein each of the two EC panes comprises an EC device that is all solid state and inorganic.

32. The IGU of claim 31, wherein the EC device of each of the two EC panes faces the interior region of the IGU.

33. The IGU of claim 23, wherein the window controller has dimensions of 6 inches by 1 inch by 1 inch, or less, on each dimension.

34. The IGU of claim 23, wherein the window controller has dimensions of 5 inches by ¾ inches by ⅝ inches, or less, on each dimension.

35. The IGU of claim 20, wherein the window controller is positioned outside a primary seal of the IGU.

36. The IGU of claim 20, wherein the window controller is positioned at least partially between the individual panes of the IGU in the secondary seal.

37. The IGU of claim 20, the window controller is positioned around one or more sides of the perimeter of the IGU.

38. The IGU of claim 20, the window controller is positioned along only one side of the perimeter of the IGU.

39. The IGU of claim 20, wherein the IGU comprises a second pane, and wherein the window controller resides entirely between the panes of the IGU.

40. The IGU of claim 20, wherein the controller is incorporated into the IGU, substantially within the secondary seal.

41. The IGU of claim 20, wherein the window controller extends beyond a perimeter of the IGU and into a frame of a window assembly.

42. An window unit comprising:
a substantially transparent substrate having an electrochromic device disposed thereon;
a controller integrated with the substrate in the window unit for providing optical switching control for the electrochromic device; and
a secondary seal on the substantially transparent substrate, which secondary seal incorporates the window controller.

43. The window unit of claim 42, further comprising:
a second substantially transparent substrate; and
a sealing separator between the first and second substantially transparent substrates, which sealing separator defines, together with the first and second substantially transparent substrates, an interior region that is thermally insulating.

44. The window unit of claim 43, wherein the controller is embedded in the sealing separator.

45. The window unit of claim 42, wherein the controller comprises control logic for directing electrochromic device to switch between three or more optical states.

46. The window unit of claim 42, wherein the controller is designed or configured to prevent the electrochromic device from being connected to in a reverse polarity mode to an external power source.

47. The window unit of claim 42, wherein the controller is configured to be powered by a source delivering between about 2 and 10 volts.

48. The window unit of claim 42, further comprising supply lines for delivering both power and communications to the controller.

49. The window unit of claim 42, wherein the controller comprises wireless communication capability.

50. The window unit of claim 42, further comprising a sensor connected to said controller.

51. The window unit of claim 50, wherein the sensor is a thermal sensor or an optical sensor.

52. The window unit of claim 50, wherein the sensor can detect a broken lead for delivering power to the electrochromic device.

53. The window unit of claim 42, wherein the controller comprises a chip, a card or a board, each including a logic circuit.

* * * * *